US012190591B2

(12) United States Patent
Yu et al.

(10) Patent No.: US 12,190,591 B2
(45) Date of Patent: Jan. 7, 2025

(54) METHOD FOR EXTRACTING MULTI-SCALE TARGET BASED ON HIGH-SPATIAL-RESOLUTION

(71) Applicant: Aerospace Information Research Institute, Chinese Academy of Sciences, Beijing (CN)

(72) Inventors: Bo Yu, Beijing (CN); Yu Wang, Beijing (CN); Fang Chen, Beijing (CN); Lei Wang, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 368 days.

(21) Appl. No.: 17/723,914

(22) Filed: Apr. 19, 2022

(65) Prior Publication Data

US 2022/0358765 A1    Nov. 10, 2022

(30) Foreign Application Priority Data

May 10, 2021  (CN) .......................... 202110504255.1

(51) Int. Cl.
*G06V 20/52*      (2022.01)
*G06N 3/04*       (2023.01)
(Continued)

(52) U.S. Cl.
CPC .............. *G06V 20/52* (2022.01); *G06N 3/04* (2013.01); *G06T 7/11* (2017.01); *G06V 10/7747* (2022.01)

(58) Field of Classification Search
CPC ...... G06F 18/214; G06N 3/04; G06N 3/0455; G06N 3/0464; G06N 3/09; G06V 10/26;
(Continued)

(56) References Cited

U.S. PATENT DOCUMENTS 5,408,588 A * 4/1995 Ulug ..................... G06N 3/063
706/41
5,430,445 A * 7/1995 Peregrim ................ G01S 13/22
342/25 C
(Continued)

FOREIGN PATENT DOCUMENTS

CN          202690133 U  *  1/2013
CN          108304846 A     7/2018
(Continued)

OTHER PUBLICATIONS

First Office Action issued on Oct. 29, 2021 for Chinese Patent Application No. 202110504255.1 (25 pages) Including English Translation.
(Continued)

*Primary Examiner* — Tsung Yin Tsai
(74) *Attorney, Agent, or Firm* — Merchant & Gould P.C.

(57) ABSTRACT

A method for extracting an oil storage tank based on a high-spatial-resolution remote sensing image is provided, including: acquiring an oil storage tank sample, and randomly dividing the oil storage tank sample into a training set and a testing set; building an oil storage tank extraction model based on a Res2-Unet model structure, wherein the Res2-Unet is a deep learning network based on a UNet semantic segmentation structure, and a Res2Net convolution block is configured to change a feature interlayer learning to a granular learning and is arranged in a residual mode; and performing a precision verification on the testing set.

9 Claims, 2 Drawing Sheets

(51) Int. Cl.
*G06T 7/11* (2017.01)
*G06V 10/774* (2022.01)

(58) Field of Classification Search
CPC .... G06V 10/7747; G06V 10/82; G06V 20/13; G06V 20/52; G06T 7/11
See application file for complete search history.

(56) References Cited

U.S. PATENT DOCUMENTS

| | | | | |
|---|---|---|---|---|
| 9,934,591 | B2* | 4/2018 | Babenko | G06V 30/1914 |
| 10,956,771 | B2 | 3/2021 | Jiang et al. | |
| 2004/0165478 | A1* | 8/2004 | Harmon, Jr. | G01V 1/003 367/87 |
| 2016/0247011 | A1* | 8/2016 | Abileah | G06V 20/13 |
| 2018/0330187 | A1* | 11/2018 | Ouzounis | G06T 7/90 |
| 2019/0122369 | A1* | 4/2019 | Jung | G06T 7/143 |
| 2019/0385004 | A1 | 12/2019 | Jiang et al. | |
| 2020/0019938 | A1* | 1/2020 | Wang | G06Q 20/123 |
| 2020/0020097 | A1* | 1/2020 | Do | G06F 18/2413 |
| 2022/0004760 | A1* | 1/2022 | Kozachenok | A01K 61/80 |
| 2022/0207890 | A1* | 6/2022 | Zhu | G06V 10/82 |
| 2022/0283295 | A1* | 9/2022 | Yang | G01S 13/9058 |

FOREIGN PATENT DOCUMENTS

| | | | |
|---|---|---|---|
| CN | 109089363 A | * | 12/2018 |
| CN | 109902600 A | | 6/2019 |
| CN | 110543822 A | | 12/2019 |
| CN | 111062872 A | | 4/2020 |
| CN | 111242127 A | | 6/2020 |
| CN | 111488805 A | | 8/2020 |
| CN | 112183635 A | | 1/2021 |

OTHER PUBLICATIONS

First Office Action issued on Feb. 17, 2023 for Australian Patent Application No. 2022202669 (3 pages).
Hao Yang et al. "Res2U-Net: Image Inpainting via Multi-scale Backbone and Channel Attention", School of Information Science and Engineering, Yunnan University, ICONIP, 2020, (12532):498-508, Springer Nature Switzerland AG, https://doi.org/10.1007/978-3-030-63830-6_42 (11 pages).

* cited by examiner

METHOD FOR EXTRACTING MULTI-SCALE TARGET BASED ON HIGH-SPATIAL-RESOLUTION

CROSS-REFERENCE TO RELATED APPLICATION

This application claims the priority of Chinese Patent Application No. 202110504255.1 filed on May 10, 2021 in the China National Intellectual Property Administration, the content of which is incorporated herein by reference in entirety.

TECHNICAL FIELD

The present disclosure relates to fields of image processing and pattern recognition, and in particular to a practical method for extracting an oil storage tank for a large-space-range high-spatial-resolution remote sensing image.

BACKGROUND

An oil storage tank, as a container for storing oil, is particularly important in storing and transiting oil and related products. Timely and accurate monitoring for oil storage tanks in a large space range is helpful to estimate an amount of oil reserves in various regions, so as to provide a data support to formulate policies related to oil production and reserves. Moreover, because oil storage tanks are often built in residential areas and near ports, real-time monitoring for oil storage tanks may help assess a threat to surrounding residents and seaports in an event of explosion and oil spill. Therefore, it is necessary to carry out a research on an efficient monitoring technology for oil storage tanks.

In recent years, with a continuous development and maturity of remote sensing technology and a rapid development of computer vision-related technologies, more and more high resolution satellite data from Chinese satellites, including GF1 satellite data, GF2 satellite data, GF6 satellite data and resource satellite data, have been widely used in target monitoring tasks in various fields, and achieved great results. At present, a method for monitoring an oil storage tank based on a high-spatial-resolution remote sensing image has been rapidly developed. Since oil storage tanks are mostly circular in a remote sensing image, template matching and Hough transform are two commonly-used traditional extraction methods. These two methods have disadvantages of a large amount of calculation, a complicated calculation and a high error rate, and it is difficult to extract a variety of oil storage tanks in a large space range. Oil storage tank extraction through a remote sensing image segmentation in combination with a computer vision-related algorithm is also a common technology. Traditional segmentation methods such as automatic threshold calculation method Otsu, mean shift, minimum spanning tree, etc. may have corresponding effects in the oil storage tank extraction, but their result precision is greatly affected by a size of the oil storage tank, a color of the oil storage tank and a contrast of the oil storage tank with the background object. With a continuous improvement of machine learning and deep learning methods, some models have achieved corresponding results in the field of the oil storage tank extraction based on the remote sensing image. A region-based convolutional neural network Faster R-CNN has been used for an oil storage tank extraction in GF2 satellite image, and 89% precision rate is achieved.

In a process of achieving a concept of the present disclosure, the inventors found that at least following problems exist in a related art. Existing methods are mostly implemented to extract an oil storage tank with a bright color, a large size, and an obvious spectral and texture difference from the background object. These methods have poor mobility and poor practicability, and many use restrictions need to be satisfied, so that it is difficult to be applied in a large area. A main reason for this problem is that oil storage tanks in different regions have different structural materials and present different spectral characteristics in the remote sensing image. Moreover, a size and a color of the oil storage tank may not be consistent in different application scenes. Limited by an imaging condition, light has a great impact on the oil storage tank in the image. In a plurality of cases, the oil storage tank may be bright white and may be easily confused with background objects. In addition, the extracted oil storage tanks are mostly fragmentary and incomplete. A main reason for this problem is that different pixels of each oil storage tank may have different reflectivity in the image, and a phenomenon of same object but different spectrum is serious.

SUMMARY

In view of this, a main objective of the present disclosure is to provide a method for extracting an oil storage tank based on a high-spatial-resolution remote sensing image, so as to partially solve at least one of the above technical problems.

In order to achieve the above objective, the present disclosure provides a method for extracting an oil storage tank based on a high-spatial-resolution remote sensing image, including:

acquiring an oil storage tank sample, and randomly dividing the oil storage tank sample into a training set and a testing set;

building an oil storage tank extraction model based on a Res2-Unet model structure, wherein the Res2-Unet is a deep learning network based on a UNet semantic segmentation structure, and a Res2Net convolution block is configured to change a feature interlayer learning to a granular learning and is arranged in a residual mode; and performing a precision verification on the testing set.

The method further includes:

assisting a learning of the oil storage tank extraction model by using a boundary loss function, wherein the boundary loss function is defined by:

$$\text{boundary} = I - Ero(I) \tag{1}$$

$$L_{boundary} = \frac{\sum_{k=1}^{n}(B_{pred}(k) - B_{gt}(k))^2}{\sum_{i=1}^{n} B_{pred}(i) + \sum_{j=1}^{n} B_{gt}(j)} \tag{2}$$

wherein boundary represents a boundary of an extracted oil storage tank, I represents a result image of the extracted oil storage tank, Ero(I) represents an image obtained by performing an erosion calculation on the image I, $B_{pred}$ represents a boundary of the oil storage tank extracted by the oil storage tank extraction model, $B_{gt}$ represents true boundary information of the oil storage tank, and $L_{boundary}$ represents a boundary loss value.

A loss function of an entire model structure of the oil storage tank extraction model is obtained by combining a binary cross entropy BCE and the boundary loss function and is shown as:

$$L = \mu L_{bce} + L_{boundary}$$

wherein a value of μ is set to 2, L represents a loss value of the entire oil storage tank extraction model, $L_{bce}$ represents a loss value corresponding to the binary cross entropy BCE, and $L_{boundary}$ represents a boundary loss value.

The deep learning network Res2-Unet comprises an encoding and a decoding, the encoding comprises performing a layer-wise Res2Net convolution operation and a pooling operation on an original input image, so as to obtain an image feature, and the decoding comprises performing a layer-wise deconvolution on the image feature to gradually increase a feature size and gradually reduce a dimension, so as to generate a single-dimensional binary result image with the same size as the input image.

The Res2Net convolution block is configured to divide a feature image obtained after performing a 1×1 convolution into four blocks according to a channel dimension, so as to obtain four feature sub-images x1, x2, x3 and x4; x1 is directly input to a feature image y1, x2 is performed by a 3×3 convolution to obtain a feature image y2, x3 and y2 are stitched and are performed by a 3×3 convolution to obtain a feature image y3, y3 and x4 are stitched and are performed by a 3×3 convolution to obtain a feature image y4, and y1, y2, y3 and y4 are stitched, are performed by a 1×1 convolution, and are stitched with an original feature image, so as to obtain an output feature image from the Res2Net convolution block.

The oil storage tank sample is acquired through a visual interpretation based on satellite images of GaoFen-1 (GF1) satellite, GaoFen-2 (GF2) satellite, GaoFen-6 (GF6) satellite and resource (ZY) satellite.

The oil storage tank sample is processed by: randomly cropping each scene of image into a 512×512 pixel patch according to a true location of the oil storage tank, and selecting green, blue and near-infrared channels as image channels A process of training the oil storage tank extraction model comprises: step-wise encoding input data into a multi-channel feature, and step-wise decoding the multi-channel feature, by chaining with a feature generated in an encoding process, into a segmentation result binary image with the same size as an input image, and wherein 1 in the binary image represents the oil storage tank, and 0 in the binary image represents a background object.

A learning rate of the oil storage tank extraction model is set to 0.01, and a stochastic gradient descent method is used for an optimization strategy.

The performing a precision verification on the testing set includes calculating an intersection over union, a F1 value, a recall rate and a precision rate, so as to evaluate a precision of the testing set.

DETAILED DESCRIPTION OF EMBODIMENTS

In order to make objectives, technical solutions and advantages of the present disclosure clearer, the present disclosure will be further described in detail below in connection with specific embodiments and with reference to the accompanying drawings.

Figure 1:
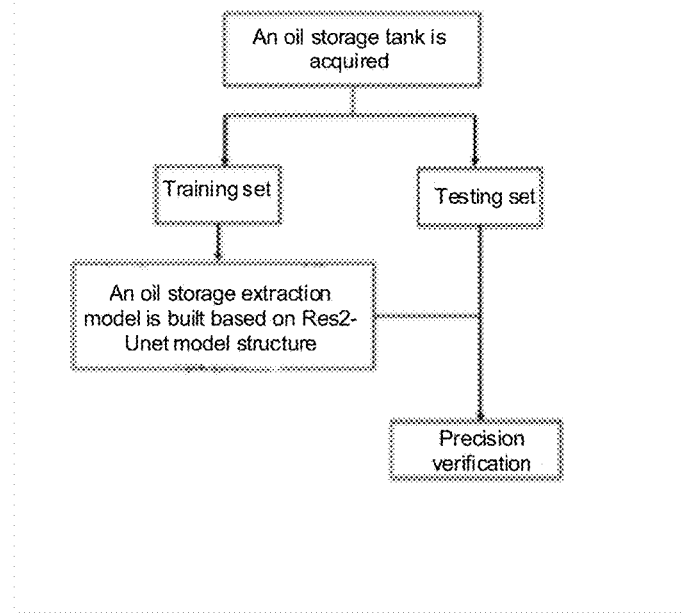
FIG. 1 shows an implementation flowchart of a method provided by the embodiments of the present disclosure.

FIG. 1 shows an implementation flowchart of a method proposed by the present disclosure. The method specifically includes the following steps.

In step 1, an oil storage tank sample is acquired, and the oil storage tank sample is randomly divided into a training set and a testing set.

According to a further embodiment of the present disclosure, the sample is acquired through a visual interpretation based on satellite images of GaoFen-1 (GF1) satellite, GaoFen-2 (GF2) satellite, GaoFen-6 (GF6) satellite and resource (ZY) satellite. Limited by a computing power of a computer, each scene of image may be randomly cropped into a 512×512 pixel patch according to a true location of the oil storage tank, and an image channel may include a green channel, a blue channel and a near-infrared channel. According to all acquired image patches, 90% of the samples are randomly selected for training, and the other 10% of the samples are used for testing.

In step 2, an oil storage tank extraction model is built based on a Res2-Unet model structure. The Res2-Unet is a deep learning network based on a UNet semantic segmentation structure, a Res2Net convolution block is used to change a feature interlayer learning to a granular learning and is arranged in a residual mode.

Figure 2:
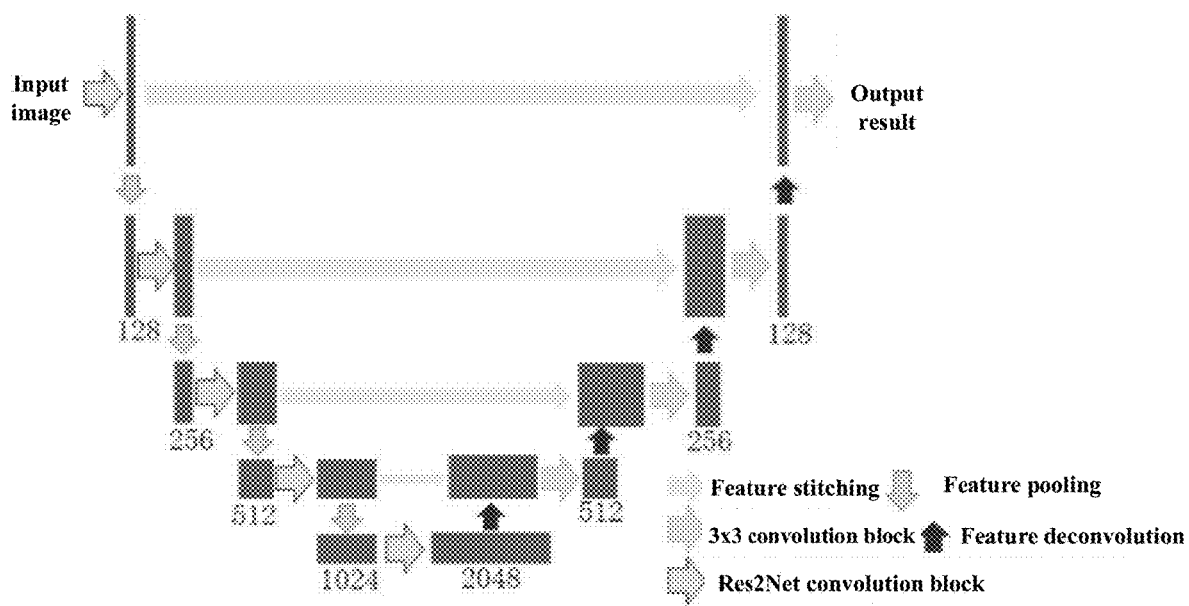
FIG. 2 shows a structural diagram of a Res2-Unet network provided by the embodiments of the present disclosure.

FIG. 2 shows a structural diagram of a Res2-Unet network. The model network structure proposed by the present disclosure mainly contains encoding and decoding. An original input image has a 3×512×512 size, that is, a three-channel 512×512 pixel size. A 128-channel feature may be generated after a first Res2Net convolution is performed, and a 2048-channel feature may be finally generated through layer-wise pooling and layer-wise Res2Net convolution operation. A process of performing the layer-wise Res2Net convolution operation and pooling operation on the original input image to obtain the 2048-dimensional feature is called encoding. Then, a layer-wise deconvolution is performed on the 2048-dimensional feature to gradually increase a feature size and gradually reduce a dimension, so as to finally generate a single-dimensional binary result image with the same size as the input image. This process is called decoding. In the generated binary result image, 0 represents a background, and 1 represents a target extract, which is the oil storage tank. In the decoding process, the features generated layer-wise in the encoding are stitched with the features of the corresponding size in the decoding, and a 3×3 convolution is performed to generate decoded features at the same time. This operation may be performed by comprehensively utilizing multi-layer information features, which is beneficial to the extraction of multi-scale oil storage tank.

Figure 3:
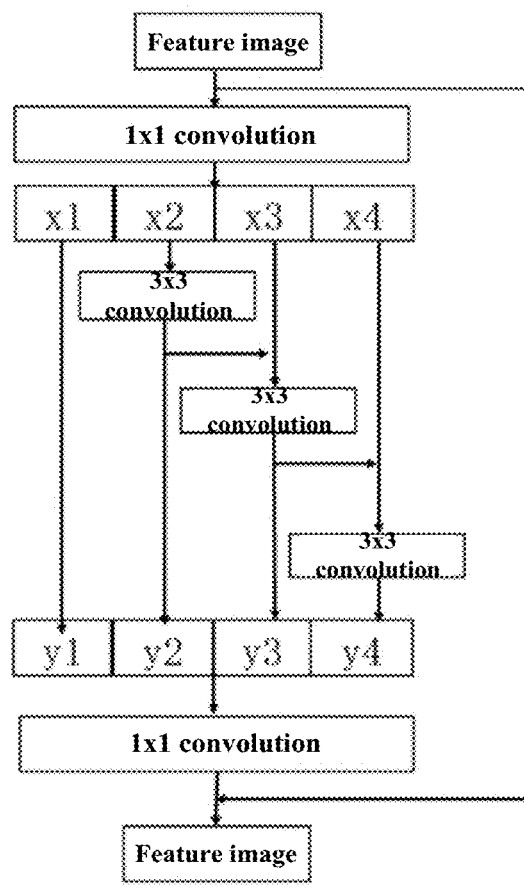
FIG. 3 shows a schematic diagram of a Res2Net convolution block provided by the embodiments of the present disclosure, in which x1, x2, x3 and x4 represent channel sub-sets of a feature image, and y1, y2, y3 and y4 represent feature sub-set image formed after corresponding convolution.

FIG. 3 shows a schematic diagram of the Res2Net convolution block. The Res2net convolution block changes a 3×3 convolution structure in traditional 1-3-1 convolution structure to a residual structure having four 3×3 convolution structures. In the traditional 1-3-1 convolution structure, convolution operations with 1×1 convolution kernel, 3×3 convolution kernel and 1×1 convolution kernel are respectively performed on an original image, so as to obtain a feature image. The Res2Net may divide a feature image obtained by performing 1×1 convolution into four blocks according to a channel dimension, so as to obtain four feature sub-images x1, x2, x3 and x4. x1 may directly act as y1. x2 is performed by a 3×3 convolution to obtain a feature image y2. x3 and y2 are stitched and are performed by a 3×3 convolution to obtain a feature image y3. y3 and x4 are stitched and are performed by a 3×3 convolution to obtain a feature image y4. y1, y2, y3 and y4 are stitched, are performed by a 1×1 convolution and are stitched with an original feature image, so as to obtain a final output feature image from the Res2Net block. In this way, a receptive field range of each network layer may be increased, an ability to learn a multi-scale feature may be improved, and it is more suitable for extracting an oil storage tank with multi-scale complex characteristics.

According to a further embodiment of the present disclosure, in view of a current problem that a boundary information of the extracted oil storage tank is incomplete, the present disclosure proposes a boundary loss function to assist the learning of the oil storage tank extraction model. A specific definition of the boundary loss function is shown in Equation (1) and Equation (2), where boundary represents a boundary of an extracted oil storage tank, I represents a result image of the extracted oil storage tank, Ero(I) represents an image obtained by performing an erosion calculation on the image I, and I−Ero(I) represents a boundary information of the extracted oil storage tank. Based on the boundary image, a difference between a pixel value of the boundary image and a pixel value of a true boundary image may be calculated according to Equation (2), and the difference may be used as a measure of a defect of the boundary information of the extracted oil storage tank. In Equation (2), $B_{pred}$ represents a boundary of the oil storage tank extracted by the oil storage tank extraction model, $B_{gt}$ represents a true boundary information of the oil storage tank, and $L_{boundary}$ represents a boundary loss value. A loss function of an entire model structure may be obtained by combining a binary cross entropy BCE and the boundary loss function and may be shown as Equation (3), where a value of µ is set to 2, L represents a loss value of the entire oil storage tank extraction model, $L_{bce}$ represents a loss value corresponding to the binary cross entropy BCE, and $L_{boundary}$ represents the boundary loss value.

$$\text{boundary} = I - Ero(I) \quad (1)$$

$$L_{boundary} = \frac{\sum_{k=1}^{n}(B_{pred}(k) - B_{gt}(k))^2}{\sum_{i=1}^{n} B_{pred}(i) + \sum_{j=1}^{n} B_{gt}(j)} \quad (2)$$

$$L = \mu L_{bce} + L_{boundary} \quad (3)$$

According to a further embodiment of the present disclosure, in a process of training the model, input data may be step-wise encoded into a 2048-channel feature firstly, and then the 2048-channel feature may be step-wise decoded, by chaining with a feature generated in the encoding process, into a segmentation result binary image with the same size as the input image. The oil storage tank is denoted by 1 in the binary image, and the background object is denoted by 0 in the binary image. A learning rate of the model is set to 0.01, and a stochastic gradient descent (SGD) method is used for an optimization strategy.

In step 3, a precision verification is performed on the testing set.

Figure 4:
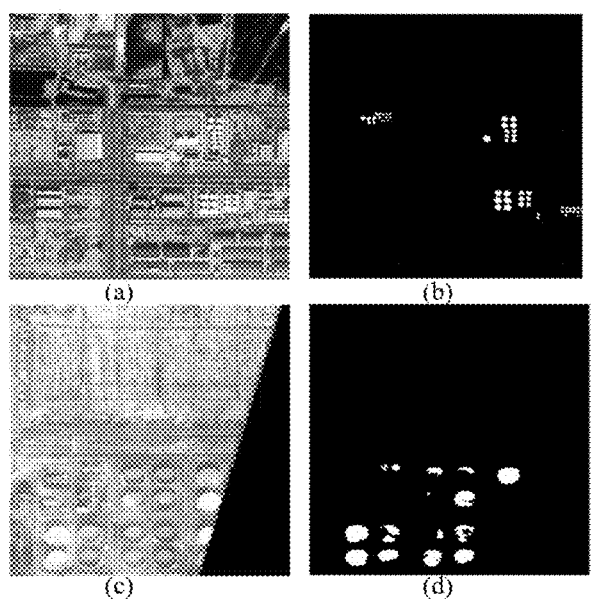
FIG. 4 shows an oil storage tank extraction diagram provided by the embodiments of the present disclosure, in which (a) and (c) are original images, and (b) and (d) are oil storage tank extraction binary images.

According to a further embodiment of the present disclosure, the trained model may be tested in the testing set to obtain an oil storage tank extraction result for the testing set. FIG. 4 shows a test sample in which oil storage tanks with various sizes are densely distributed and a test sample with a worst extraction precision. As shown, the model proposed by the present disclosure may solve the extraction problem of multi-scale oil storage tanks well, and a variety of oil storage tanks may be extracted. Even if the oil storage tank is greatly affected by a shadow and has a spectrum not much different from the background object, the trained model may still successfully extract most oil storage tank pixels. In addition, an IOU (Intersection over union), a F1 value, a recall rate and a precision rate may be calculated for the entire test sample set evaluate the precision, and statistical results are shown in Table 1. A calculation method for the IOU is shown in Equation (4), where TP represents the true number of pixels of the extracted oil storage tank, TN represents the true number of pixels of the extracted background, and FP represents the number of pixels of the true background object incorrectly classified as the oil storage tank. Specific calculation methods for the recall rate, the precision rate and the F1 value are shown in Equation (5) to Equation (7), where FP represents the number of pixels of the true oil storage tank incorrectly classified as the background object.

$$IoU = \frac{TP}{TP + TN + FP} \quad (4)$$

$$\text{Precision} = \frac{TP}{TP + FP} \quad (5)$$

$$\text{Recall} = \frac{TP}{TP + FN} \quad (6)$$

$$F1 = \frac{2 \times \text{Precision} \times \text{Recall}}{\text{Precision} + \text{Recall}} \quad (7)$$

TABLE 1

Statistical table for precision verification of oil storage tank

| IOU | Recall | Precision | F1 |
|---|---|---|---|
| 77.2% | 79.06% | 96.72% | 83.07 |

Based on the above technical solutions, it should note that the method for extracting an oil storage tank based on a high-spatial-resolution remote sensing image of the present disclosure has at least one of the following beneficial effects compared to the prior art:

A. the Unet network structure is improved using the Res2Net block, and a model's ability to learn a multi-scale feature of the oil storage tank is enhanced, so that an ability to extract different scales of oil storage tanks may be improved, and then a robustness of the model may be improved.

B. the oil storage tank extraction model is built using the Res2-Unet structure, then the model has a simple structure and is easy to train. In addition, a basic network architecture of Unet is used to layer-wise encode and decode the input image feature to obtain a final classification result, so that an ability to extract different types of oil storage tanks may be enhanced, and the mobility of the model may be improved.

C. a boundary loss is used as an auxiliary loss function to enhance the boundary information of the oil storage tank extracted by the model, so as to ensure an integrity of each extracted storage tank and reduce an influence of same object but different spectrum.

The specific embodiments described above further describe the objectives, technical solutions and advantages of the present disclosure in further detail. It should be understood that the above descriptions are only specific embodiments of the present disclosure and are not intended to limit the present disclosure. Any modifications, equivalent substitutions, improvements, etc., made within the spirit and scope of the present disclosure shall be included within the scope of protection of the present disclosure.

What is claimed is:

1. A method for extracting an oil storage tank based on a high-spatial-resolution remote sensing image, comprising:
    acquiring an oil storage tank sample, and randomly dividing the oil storage tank sample into a training set and a testing set;
    building an oil storage tank extraction model based on a Res2-Unet model structure, wherein the Res2-Unet is a deep learning network based on a UNet semantic segmentation structure, and a Res2Net convolution block is configured to change a feature interlayer learning to a granular learning and is arranged in a residual mode; and
    performing a precision verification on the testing set, the method further comprising:
    assisting a learning of the oil storage tank extraction model by using a boundary loss function, wherein the boundary loss function is defined by:

$$\text{boundary} = I - Ero(I) \quad (1)$$

$$L_{boundary} = \frac{\sum_{k=1}^{n}(B_{pred}(k) - B_{gt}(k))^2}{\sum_{i=1}^{n} B_{pred}(i) + \sum_{j=1}^{n} B_{gt}(j)} \quad (2)$$

wherein boundary represents a boundary of an extracted oil storage tank, I represents a result image of the extracted oil storage tank, Ero(I) represents an image obtained by performing an erosion calculation on the image I, $B_{pred}$ represents a boundary of the oil storage tank extracted by the oil storage tank extraction model, $B_{gt}$ represents true boundary information of the oil storage tank, and $L_{boundary}$ represents a boundary loss value.

2. The method according to claim 1, wherein a loss function of an entire model structure of the oil storage tank extraction model is obtained by combining a binary cross entropy BCE and the boundary loss function and is shown as:

$$L = \mu L_{bce} + L_{boundary}$$

wherein a value of μ is set to 2, L represents a loss value of the entire oil storage tank extraction model, $L_{bce}$ represents a loss value corresponding to the binary cross entropy BCE, and $L_{boundary}$ represents a boundary loss value.

3. The method according to claim 1, wherein the deep learning network Res2-Unet comprises an encoding and a decoding, the encoding comprises performing a layer-wise Res2Net convolution operation and a pooling operation on an original input image, so as to obtain an image feature, and the decoding comprises performing a layer-wise deconvolution on the image feature to gradually increase a feature size and gradually reduce a dimension, so as to generate a single-dimensional binary result image with the same size as the input image.

4. The method according to claim 1, wherein the Res2Net convolution block is configured to divide a feature image obtained after performing a 1×1 convolution into four blocks according to a channel dimension, so as to obtain four feature sub-images x1, x2, x3 and x4; x1 is directly input to a feature image y1, x2 is performed by a 3×3 convolution to obtain a feature image y2, x3 and y2 are stitched and are performed by a 3×3 convolution to obtain a feature image y3, y3 and x4 are stitched and are performed by a 3×3 convolution to obtain a feature image y4, and y1, y2, y3 and y4 are stitched, are performed by a 1×1 convolution, and are stitched with an original feature image, so as to obtain an output feature image from the Res2Net convolution block.

5. The method according to claim 1, wherein the oil storage tank sample is acquired through a visual interpretation based on satellite images of GaoFen-1 (GF1) satellite, GaoFen-2 (GF2) satellite, GaoFen-6 (GF6) satellite and resource (ZY) satellite.

6. The method according to claim 1, wherein the oil storage tank sample is processed by: randomly cropping each scene of image into a 512×512 pixel patch according to a true location of the oil storage tank, and selecting green, blue and near-infrared channels as image channels.

7. The method according to claim 1, wherein a process of training the oil storage tank extraction model comprises: step-wise encoding input data into a multi-channel feature, and step-wise decoding the multi-channel feature, by chaining with a feature generated in an encoding process, into a segmentation result binary image with the same size as an input image, and wherein 1 in the binary image represents the oil storage tank, and 0 in the binary image represents a background object.

8. The method according to claim 1, wherein a learning rate of the oil storage tank extraction model is set to 0.01, and a stochastic gradient descent method is used for an optimization strategy.

9. The method according to claim 1, wherein the performing a precision verification on the testing set comprises calculating an intersection over union, a F1 value, a recall rate and a precision rate, so as to evaluate a precision of the testing set.

* * * * *